United States Patent [19]
Lee

[11] Patent Number: 5,862,484
[45] Date of Patent: Jan. 19, 1999

[54] WIDE AREA PAGING SEVICE PROCESSING METHOD AND APPARATUS OF A RADIO PAGING SYSTEM

[75] Inventor: Chang-Duk Lee, Gumi, Rep. of Korea

[73] Assignee: SamSung Electronics Co., Ltd., Kyungki-do, Rep. of Korea

[21] Appl. No.: 686,051

[22] Filed: Jul. 22, 1996

[30] Foreign Application Priority Data

Jul. 21, 1995 [KR] Rep. of Korea ................. 21626/1995

[51] Int. Cl.⁶ ....................................................... H04M 7/06
[52] U.S. Cl. ........................ 455/445; 455/426; 455/31.2; 455/31.3
[58] Field of Search ................... 455/445, 426, 455/31.2

[56] References Cited

U.S. PATENT DOCUMENTS

| | | | |
|---|---|---|---|
| 3,575,558 | 4/1971 | Leyburn et al. | 455/445 |
| 4,178,476 | 12/1979 | Frost | 455/445 |
| 4,853,955 | 8/1989 | Thorn et al. | 455/445 |
| 4,875,039 | 10/1989 | Andros et al. | |
| 5,047,763 | 9/1991 | Kuznicki et al. | 455/445 |
| 5,086,461 | 2/1992 | Thorn et al. | |
| 5,122,795 | 6/1992 | Cubley et al. | |
| 5,357,561 | 10/1994 | Grube | |
| 5,539,392 | 7/1996 | Hays et al. | 455/31.3 |

*Primary Examiner*—David R. Hudspeth
*Assistant Examiner*—Daniel Abebe
*Attorney, Agent, or Firm*—Robert E. Bushnell, Esq.

[57] ABSTRACT

A wide area paging service processing method for a radio paging system connected to a public switched telephone network and having a paging system capable of transmitting a radio paging signal. The wide area paging service processing method includes the steps of: requesting a wide area call processor of said paging system to process a wide area call when a call is received to the paging system through the public switched telephone network; reading a data base of a corresponding subscriber to thereby pack information of a wide area paging message when the wide area call process is requested; packing information of the wide area paging message to send a signal message in accordance with a class of the wide area service to a corresponding area paging system through a message transfer part; and performing wide area radio call for the corresponding pager subscriber after the wide area paging message is received in the corresponding area paging system and then a call frequency which should be synchronized in a moving area by a called pager subscriber is obtained.

8 Claims, 5 Drawing Sheets

WIDE AREA PAGING SEVICE PROCESSING METHOD AND APPARATUS OF A RADIO PAGING SYSTEM

CLAIM OF PRIORITY

This application makes reference to, incorporates the same herein, and claims all benefits accruing under 35 U.S.C §119 from an application entitled *Wide Area Paging Service Processing Method Of Radio Paging System* earlier filed in the Korean Industrial Property Office on the 21st of July 1995, and there duly assigned Serial No. 21626/1995 by that Office.

BACKGROUND OF THE INVENTION

1. Field of the Invention

The present invention relates to a wide area paging service processing for radio paging systems, and more particularly, to a wide area paging service processing radio system providing subscribers with paging service even when a radio pager subscriber moves into another area with a paging receiver.

2. Description of the Related Art

Under contemporary practice, radio paging receivers are provided with radio paging service only within a local area. In a conventional radio paging system, having conventional radio paging service processing operations within a local area, a subscriber of a public switched telephone network calls a pager terminal, and the call is connected from the public switched telephone network to a radio paging system. At this time, an incoming processor of the radio paging system connects to the call, and a telephone number translator receives a pager subscriber's telephone number and then translates it. Then, if the received telephone number is an intra-office subscriber's telephone number, the radio paging system connects the call to a pager terminal. The pager terminal then generates a signal indicating that the call connection is established, and requests a transmitter to perform a radio call after storing information to be displayed by the paging receiver. At this time, if the transmitter transmits a radio paging signal, a corresponding paging receiver is called. When the subscriber with the paging receiver is out of the corresponding range, however, he can not receive the radio call.

This type of conventional radio paging system can not provide reliable radio paging service to an area outside its corresponding designated local service area. Paging systems capable of transmitting and receiving pager calls outside a paging receivers local area are known as wide area paging systems. Known wide area paging systems are discussed in, among other sources, the following U.S. patents incorporated herein by reference: U.S. Pat. No. 4,875,039 by Andrew A. Andros, et al., entitled *Paging System With Transmission Protocol Compatable With Analog And Digital Transmitters;* U.S. Pat. No. 5,122,795 by Dean Cubley, et al., entitled *Scanning Receiver For Nationwide Radio Paging System;* and U.S. Pat. No. 5,357,561 by Gary W. Grube, entitled *Communication Unit Control For Wide Area Communication Systems.*

SUMMARY OF THE INVENTION

It is therefore, one object of the present invention to provide an improved wide area call telephone system.

It is another object to provide a wide area call processing technique for providing radio paging service to a wide service area for overcoming the problems of conventional local area paging receivers.

It is still another object to provide a wide area call processing technique for providing a radio paging wide area paging service capable of transmitting paging signals to paging receivers anywhere in the country as a single range of a paging system.

To achieve these and other objects, the present invention provides a radio paging system with a wide area paging service processing technique wherein a wide area call processor is requested to process a wide area call when a call is directed to the paging receiver through a public switched telephone network (PSTN). When the wide area call process is requested, a data base of a corresponding subscriber is read and then information of a wide area paging message is packed and sent as a signal message in accordance with a class of the wide are service to a message transfer part (MTP). The wide area paging message from the message transfer part is received to obtain a call frequency which should be synchronized in a moving area by a called pager subscriber, and then a wide radio paging operation is effected for a corresponding pager subscriber.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein.

DETAILED DESCRIPTION OF THE PREFERRED EMBODIMENT

Figure 1:
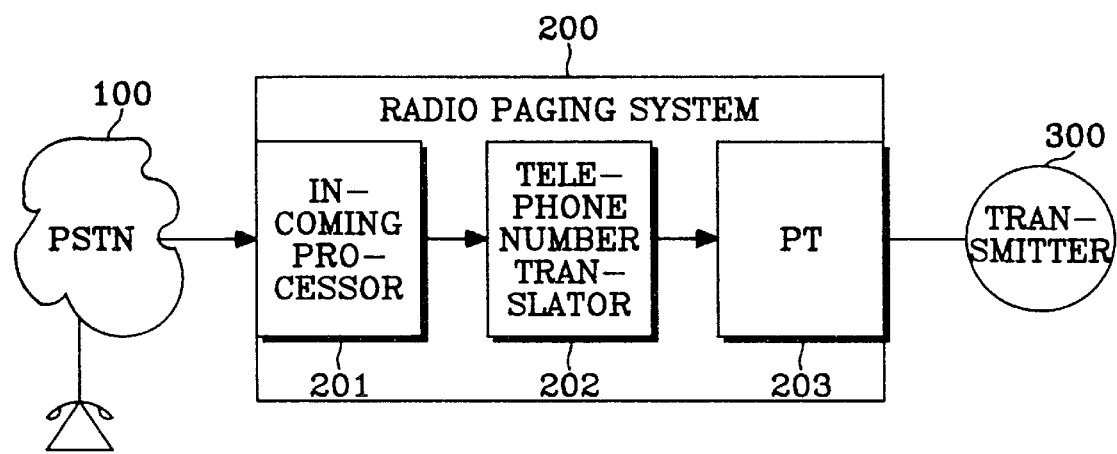
FIG. 1 is a block diagram illustrating a representation of a hypothetical typical general radio paging system.

Turning now to the drawings, FIG. 1 represents a generalized block diagram illustrating a radio paging system of the type used in an effort to give radio paging service processing operation within the single range of a local area. In this paging servicet, when the subscriber of a public switched telephone network 100 calls a paging receiver, the call is connected from public switched telephone network 100 to radio paging system 200. At this time, an incoming processor 201 of radio paging system 200 connects to the call, and a telephone number translator 202 receives a pager subscriber's telephone number, translates it and then, if the received telephone number is an intra-office subscriber's telephone number, connects the call to a pager terminal PT 203. Then, pager terminal 203 generates a signal indicating that a call connection was established, and requests transmitter 300 to perform a radio call after storing information to be displayed in a paging receiver. A this time, if transmitter 300 transmits a radio paging signal, a corresponding paging receiver is called. When a subscriber with the paging receiver is out of the range corresponding to a local area, however, he can not receive the radio call.

The radio paging system described above can not provide radio paging service within an area other than the particular local area assigned for the corresponding paging receiver.

Figure 2:
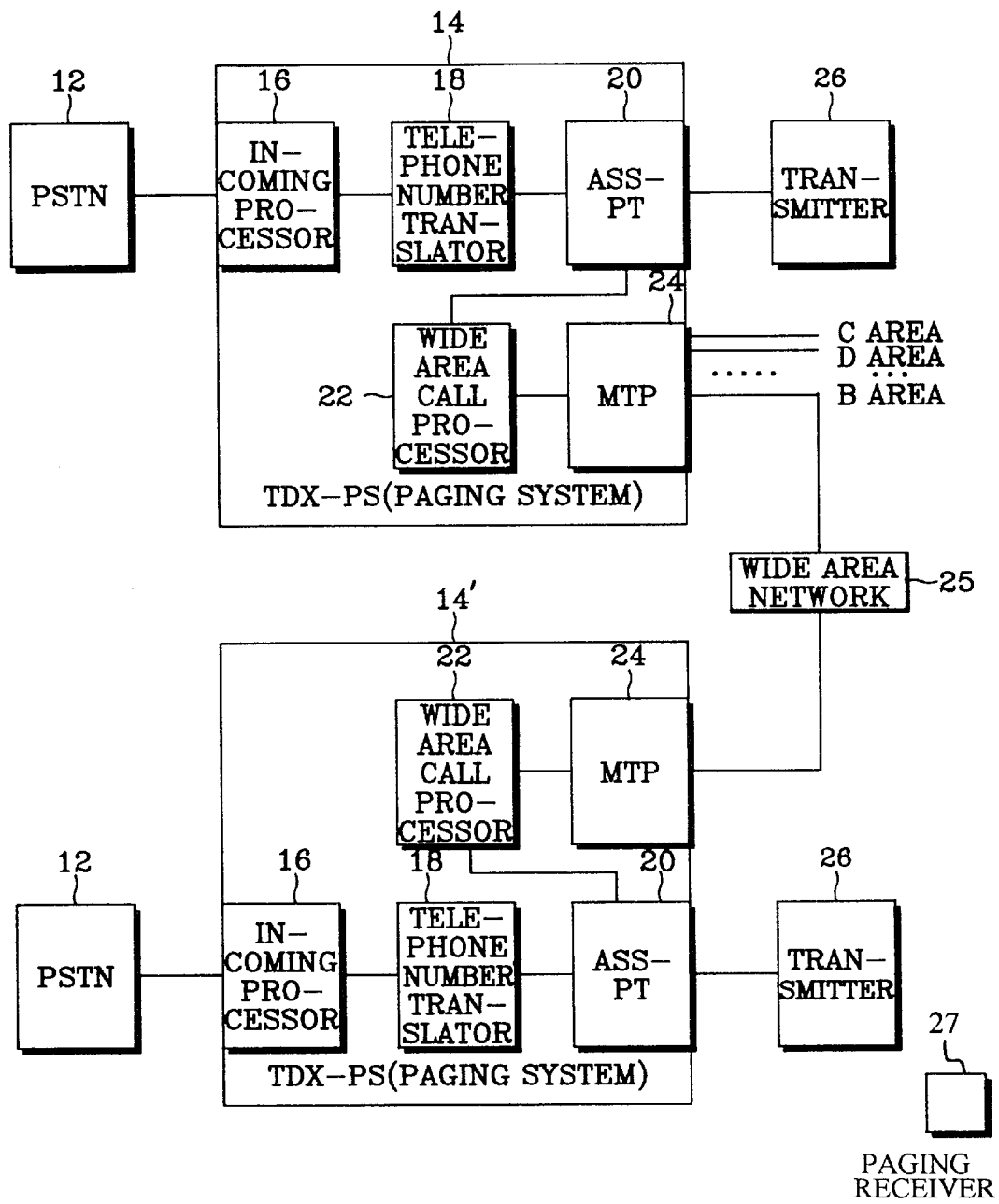
FIG. 2 is a block diagram illustrating a radio paging system constructed in accordance with the principles of the present invention.

FIG. 2 illustrates a block diagram of a wide area radio paging system constructed according to the principles of the present invention wherein PSTN 12 is a public switched telephone network, and TDX-PS 14 is a paging system having a switching function. Paging system 14 may be constructed with an incoming processor 16, a telephone number translator 18, an access switching subsystem-paging terminal (ASS-PT) 20, a wide area call processor 22 for processing the wide area call and a message transfer part 24. Incoming processor 16 interfaces a radio paging incoming call from public switched telephone network 12 to the system, and telephone number translator 18 translates and switches the incoming call from incoming processor 16. Then, if the translation result is an intra-office incoming call, access switching subsystem-paging terminal 20 transmits a radio paging signal to a transmitter 26 corresponding to an intra-office area. When a call is a wide area call, wide area call processor 22 requests message transfer part 24 to transmit the wide area paging message to paging systems of other areas.

Figure 3:
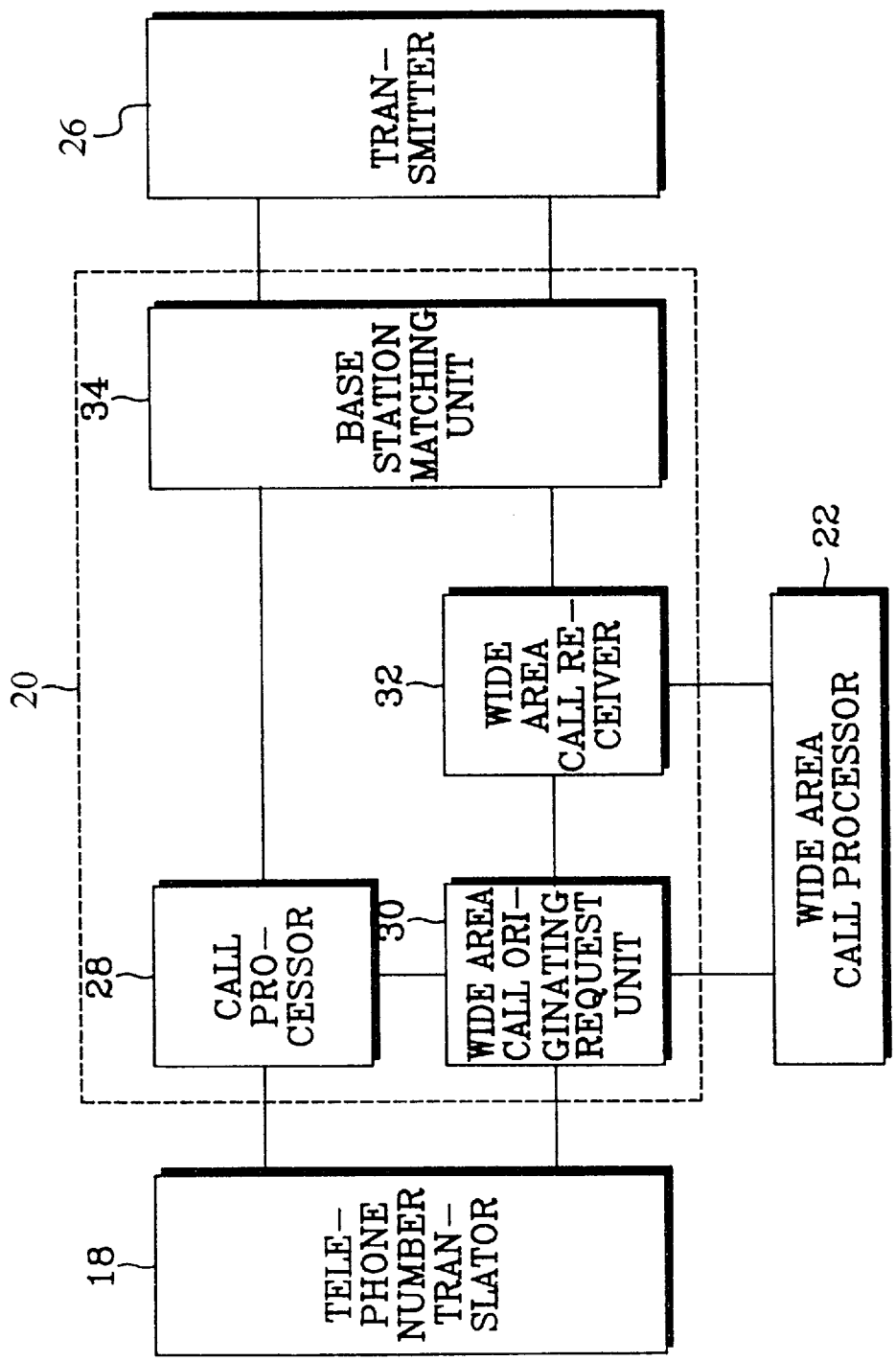
FIG. 3 is a detailed block diagram illustrating an access switching subsystem-paging receiver ASS-PT 20 constructed in accordance with the principles of the present invention.

Referring now to FIG. 3, a detailed block diagram of access switching subsystem-paging terminal 20 is shown, in accordance with the principles of the present invention, wherein a call processor 28 receives an incoming request signal from the telephone number translator 18 and determines whether the received signal is a wide area call or an intra-office call. When, the received signal is for an intra-office call, call processor 18 transmits the radio data sending request signal to a base station matching unit 34. On the other hand, when the received signal is for a wide area call, call processor 28 transmits the received signal to a wide area call originating request unit 30. Wide area call originating request unit 30 receives the incoming call from call processor 28 and transmits various information (to be described later), such as a radio frequency RF channel number, capcode, radio sending message, etc., and an area code of the radio paging receiver to an originating processing unit of wide area paging processor 22, so as to provide a paging service to other areas. Wide area call receiver 32 sends the radio data sending request signal for calling radio paging receivers assigned to base station matching unit 34 with reference to a parameter received from the originating processing unit of wide area call processor 22. Base station matching unit 34 receives the radio data sending request signal from call processor 28 or from wide area call receiver 32 to thereby change it to a protocol for the paging operation and then transmits the protocol to transmitter 26.

Figure 4A:
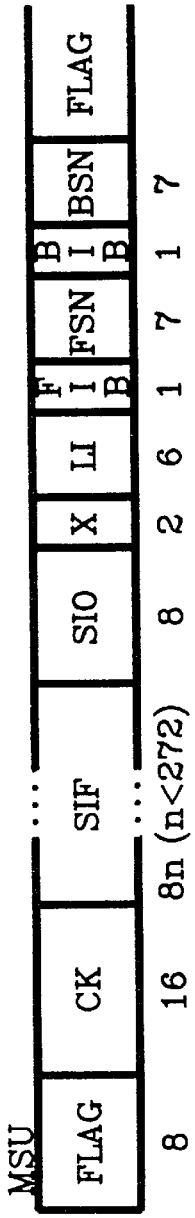
FIGS. 4A, 4B and 4C illustrate Signaling System No. 7 signal unit formats used in an embodiment of the present invention.
Figure 4B:
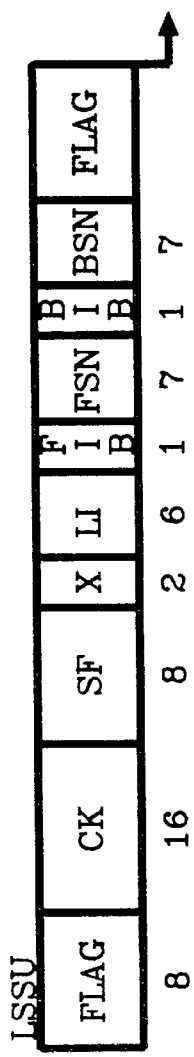
Figure 4C:
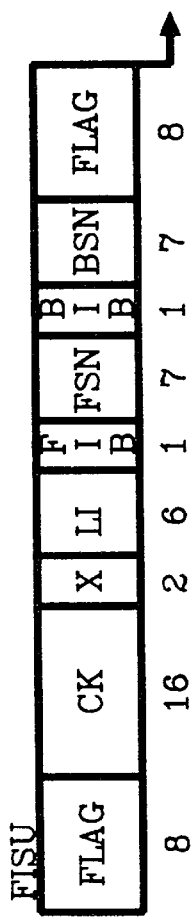

FIGS. 4A, 4B and 4C show the Signaling System No. 7 signal unit formats used in the practice of the present invention. In these formats, FLAG indicates a start and an end of a signal unit, and has an 8-bit pattern of 01111110. A 7-bit backward sequence number BSN stands for a counterpart's message serial number which is received and checked in an intra-office, and a backward indication bit BIB is used for performing sequence control and check functions of the signal unit. A 7-bit forward sequence number FSN stands for a message serial number which is transmitted from the intra-office to the counterpart, and a forward indication bit FIB is used for performing the sequence control and check functions of the signal unit. Regarding 6-bit length indicator LI, when LI is 0, a full in signaling unit (FISU) is used, and when LI is 1 or 2, a link status signaling unit (LSSU) is used. When LI is more than 2, a main signaling unit (MSU) is used. When a length of a signaling information field SIF is more than 62 and less than 272, LI is 63. An 8-bit service indication octet SIO exists only in the main signaling unit and has the following configuration.

| 4 | 4 |
|---|---|
| SSF | SI |

A 4-bit service indicator SI indicates a specific user party, and its 4-bit format is any one of the following:

0000: signaling network message (SNM);
0001: signaling network maintenance and test (SNMT);
0010: reserved;
0011: signalling connection control part (SCCP);
0100: telephony user part (TUP);
0101: ISDN user part (ISUP);
0110: data user part 1 (DUP1);
0111: data user part 2 (DUP2);
1000: spare; and
1001: (PSUP)

Paging system 14 processes the SNM, SNMT and PUSP among the above. A sub service field SSF sorts signal messages of a national and international network. The 4-bit format for SSF is any one of the following:

0000: international use,;
1000: national use; and
PSUP: it is used only within the country.

SIF (signaling information field): it includes substantial data to be transmitted to the counterpart and a destination and originating point codes of the massage, and its data format is changed according to the SI service style of the SIO. Further, the SIF comprises a label and information field, and the following table shows the format when the SI is PUSP (The format, when the SI is the SNM or the SNMT, is identical to a CCITT recommendation).

| Information Field | | LABEL | |
|---|---|---|---|
| INFORM Field | SLS | OPC | DPC |
| 8n(n<269) | 4 | 14 | 14 |

CK represents sixteen check bits for error checking the signal unit; X stands for a 2-bit unused field.

Figure 5:
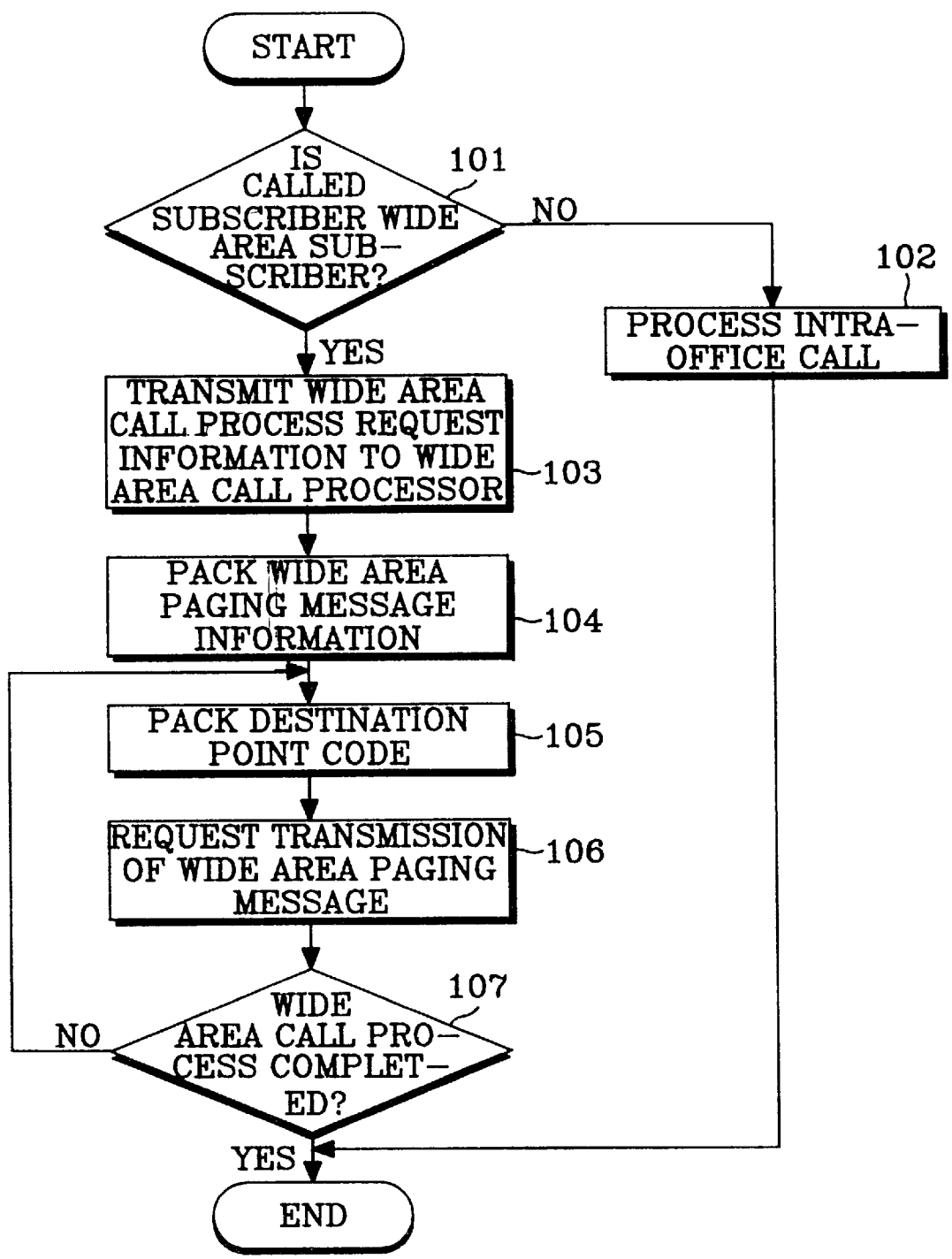
FIG. 5 is a flow chart illustrating a wide area paging service process as practiced in accordance with the principles of the present invention.

Hereinafter, the operation of the embodiment in accordance with the present invention will be in detail explained with collective reference to FIGS. 2, 3 and 5. First, when a telephone number dialed by a general telephone public switched telephone network subscriber is a telephone number for calling a radio paging receiver, incoming information with respect to the dialed number is transmitted to paging system 14. At this time, incoming processor 16 receives the radio paging signal and requests telephone number translator 18 to translate the telephone number. Telephone number translator 18 sends the incoming request signal to access switching subsystem-paging terminal 20 after translating the telephone number.

When receiving the incoming request signal from the telephone number translator 18, access switching subsystem-paging terminal 20 connects a multi-frequency receiver (MFR) to the incoming call for receiving the dual tone multi-frequency (DTMF) signal transmitted from the general subscriber's telephone. Access switching subsystem-paging terminal 20 connects the tone so that the general subscriber inputs a message to be transmitted.

When the general telephone subscriber dials the pager number of the counterpart desired to be called, and then, the incoming request signal is generated from the telephone number translator 18, access switching subsystem-paging terminal 20 receives this incoming request signal. When the reception of the incoming request signal is completed in access switching subsystem-paging terminal 20, call processor 28 checks, in step 101, whether or not a called pager subscriber is a wide area subscriber. When the called pager subscriber is not a wide area subscriber, transmits the radio data sending request signal directly to the matching unit 34 of the base station and an intra-office call is processed in step 102. On the other hand, when the called pager subscriber is a wide area subscriber in step 101, the paging processor 28 transmits the corresponding message and subscriber information to wide area call originating request unit 30 in step 103. When the user is at a location other than the local area, the user may telephonically inform the paging system that the paging receiver is out of the local area, and thus the paging system operate to call the paging receiver as a wide area paging receiver. At this time, the wide area call originating request unit 30 sends subscriber information for the paging, such as the radio frequency channel number, the capcode and the radio sending message, and the subscriber's area code, etc., to the originating processing unit of the wide area call processor 22. The wide area call processor 22 exchanges, through a general inter-process communication method, information with message transfer part 24 using the Signaling System No. 7 signal format, which is classified into the three classifications of the main signaling unit, link status signaling unit and full in signaling unit. The main signaling unit is used when desiring to exchange substantial signal information such as a wide area network message. The link status signaling unit is used upon an exchange and initial arrangement of state information of a signal link, and the full in signaling unit is used for link control and monitoring during an idle time when the main signaling unit is not received by the signal link.

In step 104, the originating processing unit of the wide area call processor 22 packs wide area paging message information into the No. 7 signal format. When the wide area call process is requested, a data base of a corresponding subscriber is read and then information of a wide area paging message is packed and sent as a signal message in accordance with a class of the wide are service to a message transfer part (MTP). The wide area paging message information may include the information set forth in Table 1.

TABLE 1

Destination Point Code (DPC)
Originating Point Code (OPC)
Signaling Link Selection (SLS)
Service Indication Octet (SIO)
Area Code of Message Originating Area
RE-CHANNEL-NO
CAPCODE
FUNCTION-DIGIT
REPEAT-COUNTER
PAGER-PRIORITY
ENCODING-TYPE
CLI-CLASS
INTERVAL
SVC-CATEGORY
CALLING-DGT-LENGTH
CALLING-DGT (16 DGT)
CALLED-PAGER-DN (7 DGT)

TABLE 1-continued

MSG-LENGTH
MSG (15 DGT)

The destination point code provides an identification number of the radio paging system which receives the signal message. The originating point code provides an identification number of the radio paging system which originates the signal message. The identification of a call class is alphanumerically or numerically displayed. The call originating area represents the area code of the message originating area. RF-CHANNEL-NO provides a radio paging frequency to be synchronized in a moving area by a called pager subscriber, and CAPCODE is an identification number of the called pager. FUNCTION-DGT represents a tone sending method of the called pager, and REPEAT-COUNTER indicates the number of times a call to a called paging receiver is to be repeated. ENCODING-TYPE is used for the identification of the protocol used between the transmitter and the called paging receiver, and is comprised of any one of known encoding types, such as, POCSAG-512bps, POCSAG-1200bps, GOLAY and NEG, etc. PAGER-PRIORITY indicates the priority of the called paging receiver, and INTERVAL represents a repeat period for repeating the call to the paging receiver. CLI-CLASS indicates whether or not the called pager subscriber is registered to a CALL-PATH-TRACE or a calling line identification CLI. The SVC-CATEGORY represents a service category (default: numeric)of the pager, i.e., tone-only, numeric and alphanumeric. CALLING-DEG-LENGTH provides the originating number length of the originating subscriber of the public switched telephone network (if the CLI-CLASS is not 1, this indicates dummy data.). CALLING-DGT provides the number of the originating subscriber of the public switched telephone network, and CALLED-PAGER-DN provides the number of the called pager subscriber. MSG-LENGTH provides an indication of the length of message information that the originating subscriber desires to transmit to the called paging receiver. MSG represents the message input by the public switched telephone network originating subscriber.

After wide area message information is packed, the destination point code is packed according to a class of the wide area service in step 105. The class of the wide area service may be classified into three classes, a wide area service (WAS) class, a multi-area service (MAS) class and an optional area service (OAS) class. After packing the destination point code in this manner, wide area call processor 22 request message transfer part 24 to transmit the wide area paging message. At this time, if the class of the wide area service is the WAS class, wide area call processor 22 reads the destination point codes of ten local systems to pack the wide area paging message, and then requests message transfer part 24 to transmit the wide area paging message. If the wide area service is the MAS class, wide area call processor 22 reads destination point codes of a few local systems to pack the wide area paging message, and then requests message transfer part 24 to transmit the wide area paging message. If the class of the wide area service is the OAS class, the wide area call processor 22 reads the destination point code of a moved area system to pack the wide area paging message, and then requests message transfer part 24 to transmit the wide area paging message. Herein, message transfer part 24 is of the CCS No. 7 CCITT REC. Q700 Series, which uses the No. 7 interoffice signal transfer method of CCITT recommendation. Message transfer part 24 is provided with the wide area paging message, and then sends it to a message transfer part 24 of the corresponding area paging system 14' via the wide area network 25.

The message transfer part 24 of the corresponding area paging system 14' receives the wide area paging message from wide area network 25, and outputs the received message to the wide area call processor 22. Herein, the corresponding area paging system 14' represents the paging system of the region where the wide area pager subscriber is positioned. The wide area call processor 22 of the corresponding area detects the RF-CHANNEL-NO information among the information packed in the wide area paging message, and then if the paging receiver for processing the detected RF-CHANNEL-NO exists, requests access switching subsystem-paging terminal 20 to send the wide area call. At this time, access switching subsystem-paging terminal 20 receives the wide area call sending request signal and then requests transmitter 26 to perform the wide area radio paging, thereby calling corresponding paging receiver 27. In the foregoing manner, the wide area call is processed, and the wide area call processor checks whether or not the called wide area call process is completed in step 107, and then if it is not completed, returns to step 105, and if it is completed in step 107, ends the program.

As is apparent from the foregoing, the present invention establishes the data communication network between the radio paging systems, and receives and transmits pager information via the established data communication network and, thereby the radio pager subscriber can be provided with the radio paging service when he moves the paging receiver to another area.

Therefore, it should be understood that the present invention is not limited to the particular embodiment disclosed herein as the best mode contemplated for carrying out the present invention, but rather that the present invention is not limited to the specific embodiment described in this specification except as defined in the appended claims.

What is claimed is:

1. A wide area paging service process method of a radio paging system, said method comprising the steps of:
    requesting a wide area call process to be performed by a wide area call processor of a radio paging system connected to a public switched telephone network when a wide area call is received by said paging system through said public switched telephone network;
    reading a data base of a corresponding paging receiver and packing information for a wide area paging message when the wide area call process is requested;
    packing information of said wide area paging message to send a signal message in a signaling system No. 7 signal format in accordance with a class of a wide area service to a corresponding area paging system through a message transfer part; and
    performing wide area radio call by transmitting a radio paging signal for the corresponding paging receiver after said wide area paging message is received by the corresponding area paging system and then synchronizing said corresponding paging receiver to an obtained call frequency.

2. The wide area paging process method as set forth in claim 1, said class of said wide area service comprises any one of a wide area service class, a multi-area service class and an optional area service class.

3. A wide area paging apparatus having an incoming processor providing an interface for receiving a call from a public switched telephone network and providing the call to a telephone number translator, said apparatus comprising:

an access switching subsystem-paging terminal for providing a radio paging signal to a transmitter when a telephone number translated by said telephone number translator corresponds to an intra-office call;
    said transmitter transmitting a paging message to a paging receiver in a local area; and
    means for transmitting a wide area paging message having a signaling system No. 7 signal format to a paging system of an area other than said local area when said telephone number translated by said telephone number translator corresponds to a wide area call.

4. The apparatus as set forth in claim 3, said access switching subsystem-paging terminal comprising:
    a call processor determining whether the received call is a wide area call or an intra-office call, said call processor providing said radio data sending request signal to a base station matching unit when said received call is determined to be an intra-office call;
    said base station matching unit converting said radio data sending request signal received from said call processor to an intra-office protocol and provides said intra-office protocol to said transmitter;
    a wide area originating request unit, said wide are originating request unit receiving said received call from said call processor when said call processor determines said received call to be a wide area call;
    said wide are originating request unit providing information corresponding to said paging receiver to said means for transmitting a wide area paging message; and
    a wide area call receiver, said means for transmitting a wide area paging message controlling said wide area call receiver, said wide area call receiver providing a wide area radio data sending request signal to said base station matching unit for conversion to a wide area protocol, said wide area protocol being provided to said transmitter.

5. The apparatus as set forth in claim 3, said means for transmitting a wide area paging message comprising:
    a wide area call processor for packing information corresponding to said paging receiver into said signaling system No. 7 signal format; and
    message transfer means receiving said packed information and transmitting said wide area paging message to a wide area network.

6. The apparatus as set forth in claim 4, said means for transmitting a wide area paging message comprising:
    a wide area call processor for packing information corresponding to said paging receiver into said signaling system No. 7 signal format; and
    message transfer means receiving said packed information and transmitting said wide area paging message to a wide area network.

7. The apparatus as set forth in claim 4, further comprised of:
    said message transfer part receiving a wide area paging message from said wide area network;
    said wide area call processor receiving said wide area paging message received through said message transfer part and detecting radio frequency channel number information from among information packed in said wide area paging message;
    said wide area call processor requesting said access switching subsystem-paging terminal provide a radio paging signal to said transmitter when a paging receiver for processing the detected radio frequency channel number exists within a local area.

8. The apparatus as set forth in claim 5, further comprised of:

said message transfer part receiving a wide area paging message from said wide area network;

said wide area call processor receiving said wide area paging message received through said message transfer part and detecting radio frequency channel number information from among information packed in said wide area paging message;

said wide area call processor requesting said access switching subsystem-paging terminal provide a radio paging signal to said transmitter when a paging receiver for processing the detected radio frequency channel number exists within a local area.

* * * * *